United States Patent [19]
Yoshida

[11] Patent Number: 6,084,625
[45] Date of Patent: Jul. 4, 2000

[54] IMAGE RECORDING APPARATUS AND IMAGE EXPOSURE DEVICE PROVIDED THEREIN

[75] Inventor: Futoshi Yoshida, Kanagawa, Japan

[73] Assignee: Fuji Photo Film Co., Ltd., Kanagawa, Japan

[21] Appl. No.: 08/933,972

[22] Filed: Sep. 19, 1997

[30] Foreign Application Priority Data

Sep. 20, 1996 [JP] Japan .................................. 8-249682

[51] Int. Cl.⁷ .............................. B41J 2/45; B41J 2/435; B41J 2/47
[52] U.S. Cl. ........................................... 347/238; 347/232
[58] Field of Search .................................. 347/238, 232, 347/241, 240; 355/400

[56] References Cited

U.S. PATENT DOCUMENTS

| | | | |
|---|---|---|---|
| 4,739,416 | 4/1988 | Manian | 347/232 |
| 4,780,730 | 10/1988 | Dodge et al. | 347/237 |
| 4,907,034 | 3/1990 | Doi et al. | 355/400 |
| 4,940,314 | 7/1990 | Hecht | 347/135 |
| 4,984,035 | 1/1991 | Kanzawa et al. | 257/93 |
| 5,543,830 | 8/1996 | Lea | 347/238 |
| 5,642,149 | 6/1997 | Palum | 347/241 |
| 5,649,269 | 7/1997 | Doi et al. | 399/207 |
| 5,712,674 | 1/1998 | Doi | 347/238 |

*Primary Examiner*—N. Le
*Assistant Examiner*—Thinh Nguyen
*Attorney, Agent, or Firm*—Sughrue, Mion, Zinn, Macpeak & Seas, PLLC

[57] ABSTRACT

There is provided an image exposure device in an image recording apparatus which has a simple and compact structure without requiring relatively high assembling accuracy. The light source portion 204 is formed with the plurality of LED chips 208 being arranged in groups. These LED chips 208 which emit light of colors of blue (B), green (G), and R (red) (when described below for each of the colors, the LED chip which emits light of blue is referred to as B-LED chip 208B, the LED chip which emits light of green is referred to as G-LED chip 208G, and the LED chip which emits light of red is referred to as R-LED chip 208R) are mounted onto a substrate 210 along the transverse direction of the photosensitive material 106 (i.e., the main scanning direction) in accordance with the same arrangement rule. Namely, the totaled six rows of LED chips 208 are arranged in a zigzag manner in the plan view of the substrate 210.

18 Claims, 8 Drawing Sheets

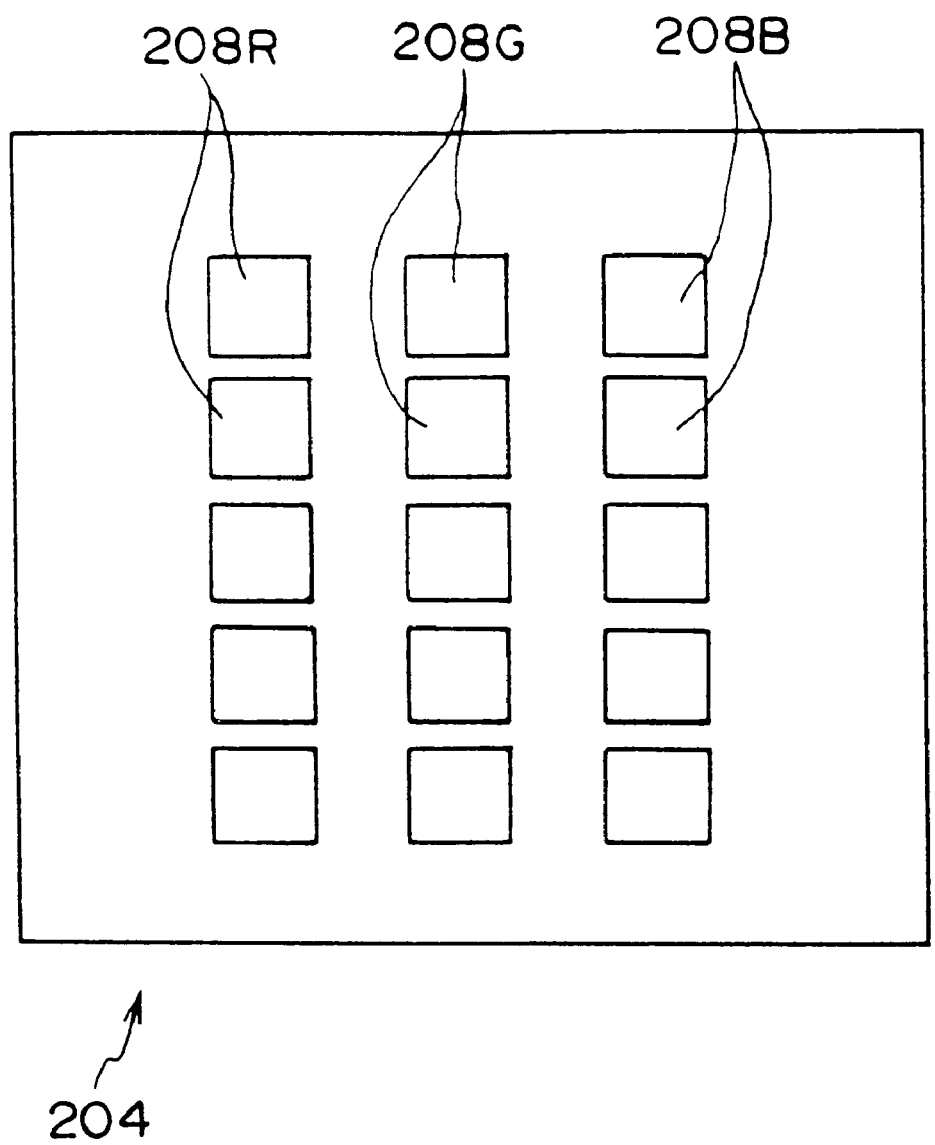

IMAGE RECORDING APPARATUS AND IMAGE EXPOSURE DEVICE PROVIDED THEREIN

BACKGROUND OF THE INVENTION

1. Field of the Invention

The present invention relates to an image recording apparatus with an image exposure device provided therein in which an image is exposed onto a photosensitive material and heat development and transfer processing is effected in such a manner that the photosensitive material and an image receiving material, to which an image forming solvent is applied, overlap with each other to thereby form an image on the image receiving material.

2. Description of the Related Art

A number of image recording apparatuses' each having a digital exposure system mounted thereon have been developed. Generally, in the digital exposure system, an image is recorded on a recording medium in such a manner that a light beam outputted from a semiconductor laser carries image data and the light beam is deflected by high-speed rotation of a polygon mirror (main scanning), and further the light beam reflected by the polygon mirror is subjected to sub-scanning with a galvano mirror or the like, or the above main scanning is effected repeatedly while moving the recording medium (or moving the recording medium stepwise). Here, as the recording medium, a photosensitive drum electrified by corona discharge, a photosensitive material, or the like may be used. Further, in place of the semiconductor laser, other light emitter such as an LED may be used as a light source.

On the other hand, there exists an image recording apparatus in which, after an image has been recorded on a photosensitive material, the image is transferred to an image receiving material by heat development-transfer processing with the photosensitive material an d the image receiving material overlapping each other. This apparatus includes a so-called analog exposure system (in this case, slit exposure is usually used in which light is irradiated on an original material and the light reflected therefrom is sequentially guided to the photosensitive material) and a digital exposure system, which are used to record the image on the photosensitive material.

Further, the image can be recorded on an image receiving material having substantially the same quality as that of general paper, and the above image recording apparatus is suitably applied to various fields by selecting the analog exposure system or the digital exposure system as described above.

Incidentally, when the image recording apparatus as described above is used as an output device for various networks or personal computers, it is necessary to use the digital exposure system.

However, the above-described image recording apparatus of heat development-transfer type requires, in addition to the digital exposure system, many functions (mechanisms) such as a mechanism for allowing the photosensitive material and the image receiving material to overlap each other, an image forming solvent-applying mechanism for facilitating formation of an image during heat development-transfer processing, a heat development mechanism, a mechanism for separating the photosensitive material and the image receiving material from each other, and the like, and the apparatus is thereby made larger. Further, in the case of full-color printing processing, high-accurate assembling of component parts is required to prevent misregistration of colors, or the like, thereby resulting in deterioration of assembly operating efficiency.

SUMMARY OF THE INVENTION

In view of the above-described circumstances, it is an object of the present invention to provide an image recording apparatus and an image exposure device provided therein which can be made compact with a simple structure without relatively high assembly accuracy being required.

The invention described in claim 1 is an image exposure device in which an image is recorded on a photosensitive material by controlling emission of light of three colors from a light source with an image data signal, comprising: the light source in which LED chips of three colors each having a different light-emission peak wavelength are mounted onto a common substrate so that at least one LED chip provided for each of the three colors is arranged in a straight line; an optical system for forming an image on the photosensitive material with light from the LED chips of the three colors; a main scanning drive system which moves a unit, in which said light source and said optical system are formed integrally with each other, so that the same straight line is scanned with the light from the LED chips of the three colors; and a sub-scan drive system which moves the photosensitive material in a stepwise manner in a direction perpendicular to the main scanning direction per each main scanning operation.

According to the above-described invention, as the main scanning/sub-scanning exposure system, one or more than one LED chips provided for each of the three colors are mounted on a single substrate. For this reason, wiring processing or the like can be reduced to the minimum and the apparatus can be made compact with no wiring space being required.

Moreover, since the optical system such as LED chips, an imaging lens, and the like are formed as a unit, it can be assembled, as a subassembly, outside the apparatus, and even at the time of maintenance, the entire unit can be removed. As a result, assembly operating efficiency and maintenance operating efficiency can both be improved.

In addition, since the LED chips of the three colors are arranged in the main scanning direction, there is no offset of the image signal in the sub-scanning direction. Further, it suffices that image data of at least one line are sequentially read out, and therefore, the structure of the controller for managing the image data can be simplified.

The invention described in claims 2 is an image exposure device, wherein the light source is formed in such a manner that the LED chips of the three colors, apart from those arranged in one row, are provided also in a direction perpendicular to said one row of the LED chips in a plurality of rows at equal intervals.

According to the above-described invention, it is possible to record images on a plurality of lines at one scanning to thereby improve the efficiency of an image exposure operation.

The invention described in claim 3 is an image exposure device, wherein the LED chips of the three colors which are provided in a plurality of rows at equal intervals in the direction perpendicular to the one row of the LED chips of the three colors are arranged in a zigzag manner.

According to the above-described invention, since the LED chips are arranged in a zigzag manner in a direction perpendicular to the one row of the LED chips of the three colors, a plurality of lines can be recorded closely and synchronously at one main scanning.

The invention described in claim 4 is an image exposure device, wherein the LED chips disposed adjacently in the direction perpendicular to those arranged in the one row are each provided with a zigzag-like stepped portion so that borders of regions from which light is actually emitted coincides with each other.

According to the above-described invention, since the LED chips has the zigzag-like stepped arrangement in which borders of the regions from which light is actually emitted coincides with each other, scan lines stored at one main scanning can be made close to one another and the pitch which moves in the direction perpendicular to the main scanning direction can be set as a widthwise dimension of the lines provided in the sub-scanning direction of the LED chips. As a result, the time for recording can be shortened.

The invention described in claim 5 is an image exposure device, wherein the substrate is made of a metal plate which is insulated for each of LED wires to prevent short-circuit.

According to the above-described invention, the substrate is made of metal to allow improvement of the heat dissipation effect and generation of heat during emission of light from the LED chips can be restrained.

The invention described in claim 6 is an image exposure device, wherein the optical system is formed by a telecentric lens.

According to the above-described invention, since the telecentric lens is used, the magnification of an LED image is not affected even when an error in assembling of the optical unit, an error in assembling of the substrate to the unit, and a variation in the distance between the photosensitive material and the unit, caused when the unit is moved by the main scanning drive system, are caused. For this reason, the assembly can be effected in a relatively rough manner.

BRIEF DESCRIPTION OF THE DRAWINGS

FIG. 8 is a plan view showing a modified example of the light source portion applied to each of the embodiments.

DESCRIPTION OF THE PREFERRED EMBODIMENTS

Figure 1:
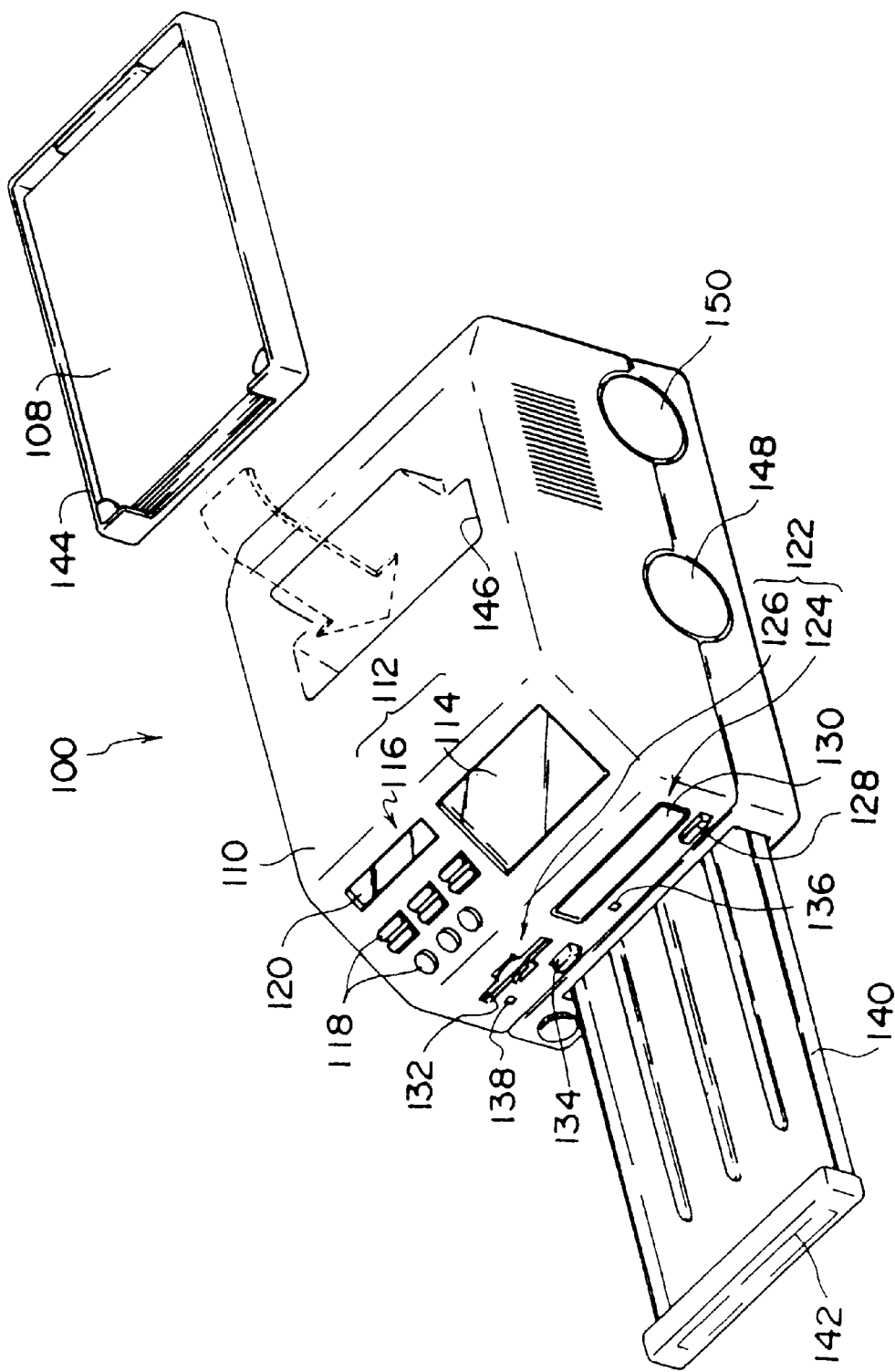
FIG. 1 is a perspective view of an image recording apparatus according to a first embodiment of the present invention.
Figure 2:
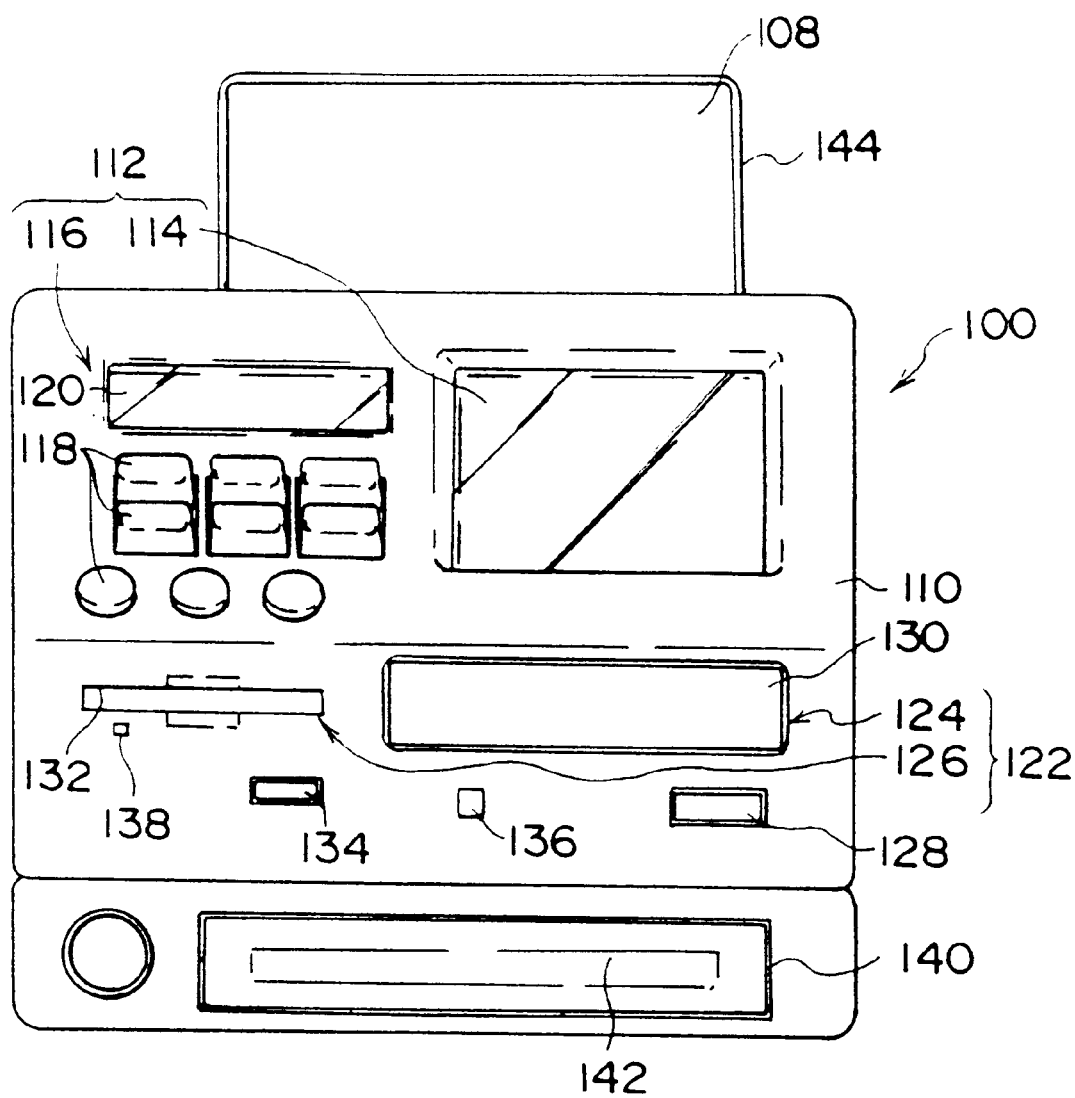
FIG. 2 is a front view of the image recording apparatus according to the first embodiment of the present invention.
Figure 3:
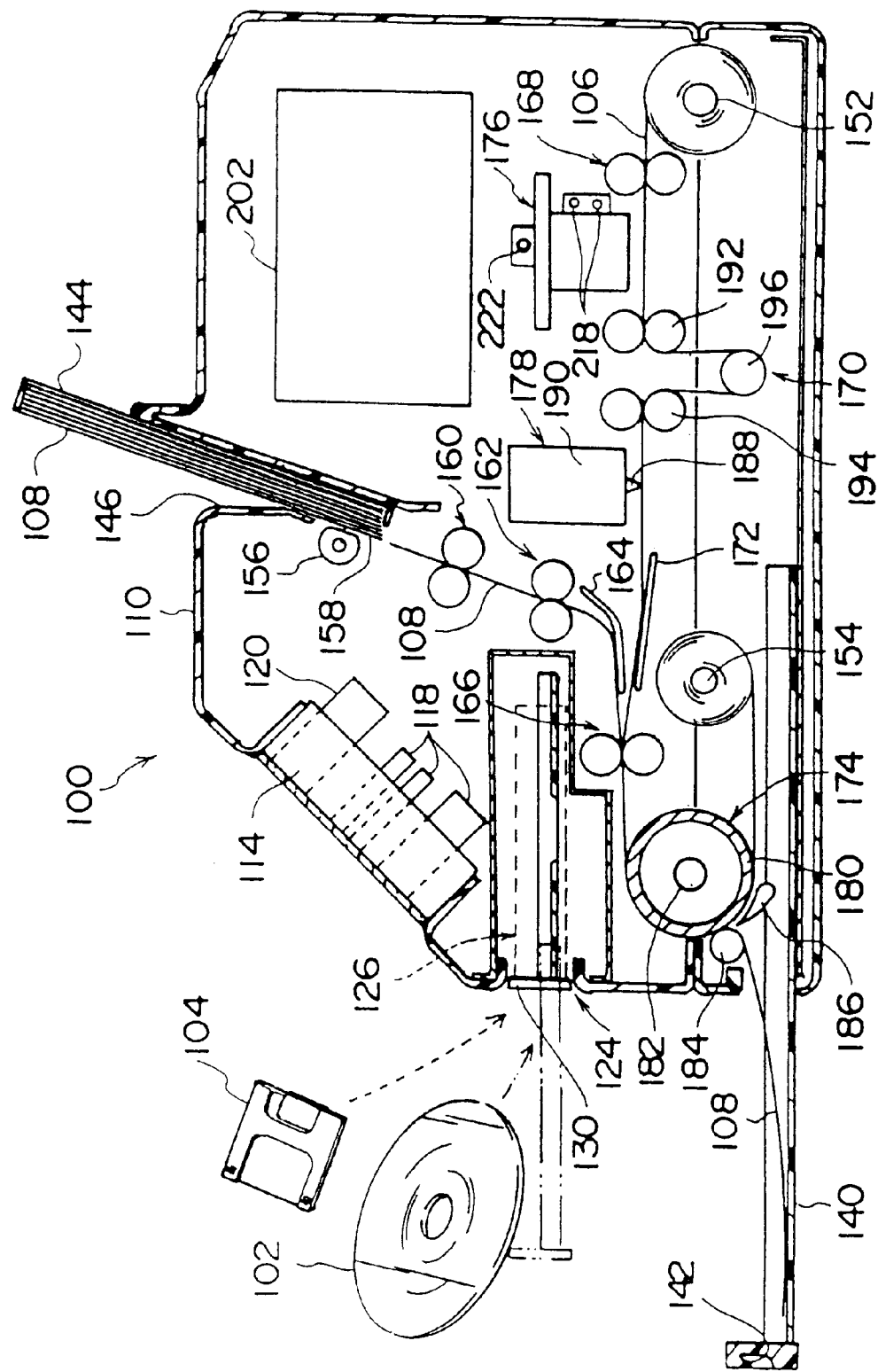
FIG. 3 is a cross-sectional side view showing an internal structure of the image recording apparatus according to the first embodiment of the present invention.

First Embodiment
Overall Structure (Exterior View):

Referring now to FIGS. 1 through 3, an image recording apparatus 100 according to a first embodiment of the present invention is shown therein.

The image recording apparatus 100 reads image data recorded on a CD-ROM 102 or an FD 104 (which are both shown in FIG. 3) to expose onto a photosensitive material 106, and transfers an image recorded on the photosensitive material 106 to an image receiving paper 108 and outputs the image receiving paper 108.

An upper portion of the front surface of a box-shaped casing 110 (at the left side on the paper of FIG. 3) is formed as an inclined surface and an operation indicating portion 112 is provided thereon.

As shown in FIG. 2, the operation indicating portion 112 is divided into a monitor portion 114 and an input portion 116 which are disposed at right and left sides, respectively. The monitor portion 114 allows projection of the read image thereon.

Further, the input portion 116 is formed by a plurality of operation keys 118 and a display portion 120 for confirmation of input data and allows input of data which is required for image recording, for example, the number of sheets to be recorded, size setting, color-balance adjustment, negative/positive selection, and the like.

A deck portion 122 is provided below the operation indicating portion 112. The deck portion 122 is formed by an optical-disk deck portion 124 and an FD deck portion 126 which are disposed at right and left sides, respectively, on the paper of FIG. 2.

The optical-disk deck portion 124 is provided in such a manner that a tray 130 can be opened and closed by pressing an open/close button 128. An optical disk 102 can be mounted in an interior of the apparatus in such a manner as to be placed on the tray 130.

An FD insertion throttle 132 is provided in the FD deck portion 126. When the FD 104 is inserted in the FD insertion throttle 132, a drive system within the apparatus is actuated to insert the FD 104 into the apparatus. Further, in order to take out the FD 104 from the FD deck portion 126, an operation button 134 is pressed to pull out the FD 104.

Further, access lamps 136, 138 are respectively provided for the optical disk deck portion 124 and the FD deck portion 126 and are provided to be turned on during access within the apparatus.

A discharge tray 140 is provided further below the deck portion 122. The discharge tray 140 is usually accommodated within the apparatus and is provided to be pulled out by an operator's finger being put on a holding portion 142 (see FIG. 1).

The image receiving paper 108 on which the image is recorded is discharged onto the discharge tray 140.

The image receiving paper 108 is previously accommodated on a tray 144 in a layered form. The tray 144 is mounted in a tray mounting hole 146 formed on an upper surface of the casing 110. The image receiving papers 108 are taken out one by one from the tray 144 mounted in the tray mounting hole 146, and after images are transferred onto the image receiving papers 108, these image receiving papers are guided to the discharge tray 140.

Two circular cover members 148, 150 are attached to the side surface of the casing 110 (toward the front side on the paper of FIG. 1). These cover members 148, 150 are each provided to be independently removable. As shown in FIG. 3, a take-up reel 154 and a feed reel 152 onto which the rolled photosensitive material 106 is wound are disposed within the apparatus along axial directions of the cover members 148, 150, respectively. These reels 152, 154 can be taken out from or loaded in the apparatus with the covers 148, 150 being removed.

Image Receiving Paper Conveying System:

As shown in FIG. 3, the tray 144 mounted in the tray mounting hole 146 is provided such that an upper surface of the leading end of the tray (at the side where the tray 144 is inserted into the tray mounting hole 146) faces a semicircular roller 156.

The semicircular roller 156 is formed with a part of the peripheral surface being cut out along a tangential line thereof. Usually, a cutting portion 158 faces an uppermost image receiving paper 108 within the tray 144 with a space formed therebetween. When the semicircular roller 156 rotates, the image receiving paper 108 of the uppermost layer and the peripheral surface of the semicircular roller 156 contact each other, and the image receiving paper 108 is pulled out by a small amount each time the semicircular roller 156 makes one rotation. The pulled-out image receiving paper 108 is nipped between a first roller pair 160 and is completely pulled out from the tray 144 by driving force of the first roller pair 160.

A second roller pair 162, a guide plate 164, and a third roller pair 166 are sequentially disposed at the downstream side of the first roller pair 160. The image receiving paper 108 is, after having been nipped by the first roller pair 160, nipped by the second roller pair 162, guided by the guide plate 164, and further nipped by the third roller pair 166.

The image receiving paper 106 overlaps with the photosensitive material 106 at the third roller pair 166. Namely, the third roller pair 166 is also used as a conveying path of the photosensitive material 106.

Photosensitive Material Conveying System:

The photosensitive material 106 is accommodated in the apparatus in a state of being elongated and wound onto the feed reel 152 in a layered form. The feed reel 152 is mounted at a predetermined position in such a manner that the cover member 150 (at the rear side of the apparatus) is removed and the feed reel 152 is inserted into the apparatus in the axial direction thereof.

With the photosensitive material 106 being mounted at the predetermined position, loading is effected along a predetermined conveying path with an outermost layer of the photosensitive material 106 being set as pull-out initialization. The loading of the photosensitive material 106 is effected in such a procedure that the outermost layer thereof is pulled out from the feed reel 152, nipped by a fourth roller pair 168 in the vicinity of the feed reel 152, conveyed through a reservoir portion 170 and a guide plate 172, and is nipped by the third roller pair 166, and thereafter, the outermost layer is sequentially entrained onto a heat roller 174 and a take-up reel 154. In this case, a leader tape having a length required for loading may be provided at the leading end portion of the photosensitive material 106 wound onto the feed reel 152.

On the conveying path of the photosensitive material 106, an exposure section 176 is provided between the fourth roller pair 168 and the reservoir portion 170. Further, a water applying portion 178 is provided between the reservoir portion 170 and the guide plate 172. The exposure section 176 and the water applying portion 178 will be described later in detail. After the image has been exposed onto the photosensitive material 106 in the exposure section 176, the photosensitive material 106 is provided to overlap with the image receiving material 108 at the third roller pair 166 in a state in which water is applied to an emulsion surface (i.e., a surface to be exposed) of the photosensitive material.

Heat Roller:

The heat roller 174 serves as a heat development-transfer section of the apparatus according to the present invention and is formed by a cylindrical roller main body 180 and a heater 182 provided within the roller main body 180 along the axial direction of the roller. The heat roller 174 serves to apply heat for members wound onto the roller main body 180 (i.e., the photosensitive material 106 and the image receiving material 108) in such a manner that the surface of the roller main body 180 is heated by actuation of the heater 182. The heating of the heat roller 174 allows heat development-transfer processing and the image recorded on the photosensitive material 106 is thereby transferred onto the image receiving paper 108.

A peeling roller 184 and a peeling claw 186 are disposed in the vicinity of a lower right side of the heat roller 174 and are provided to separate from the photosensitive material 106 the image receiving paper 108 wound onto the heat roller 174 by a length of about one third the overall circumference of the heat roller 174 to guide the image receiving paper 108 toward the discharge tray 140.

On the other hand, the photosensitive material 106 is wound onto the heat roller 174 by a length of about a half the overall circumference of the heat roller and is turned to an opposite direction to be guided to a position where the take-up reel 154 is mounted.

Water Applying Portion:

As shown in FIG. 3, the water applying portion 178 operates to apply water, serving as an image forming solvent, onto the photosensitive material 106 or the image receiving paper 108 to allow overlapping surfaces of the photosensitive material 106 and the image receiving paper 108 t o closely adhere to each other for heat development. The water applying portion 178 is formed by an applying member 188 extending along a transverse direction of the photosensitive material 106 and a tank 190 in which water is filled.

The applying member 188 is formed of a high absorptive material, for example, felt or sponge, having a proper degree of hardness and is provided to contact the photosensitive material 106 at a predetermined pressure during conveying of the photosensitive material 106. Water filled in the tank 190 is constantly supplied to the applying member 188 by a proper amount by taking advantage of capillary phenomenon. When the photosensitive material 106 and the applying member 188 contact each other, water is applied onto the surface (i.e., the emulsion surface) of the photosensitive material 106 by the applying member 188.

Further, since the applying member 188 abuts against the photosensitive material 106 at a proper pressure, water is uniformly applied to the photosensitive material 106.

Replenishment of water into the tank 190 is effected in such a manner that the entire water applying portion 178 is removed from the apparatus, but water may be constantly supplied from an exterior of the apparatus by using a pipe arrangement.

Meanwhile, in the present embodiment, water is used as the image forming solvent, but the water used in this embodiment is not limited to pure water and includes water which is widely and generally used. Further, a mixed solvent of water and a low-boiling-point solvent such as methanol, DMF, acetone, diisobutylketone, or the like may be used. Moreover, a solution which contains an image formation accelerator, an anti-fogging agent, a development stopping agent, hydrophilic heat solvent, or the like may also be used.

Figure 4:
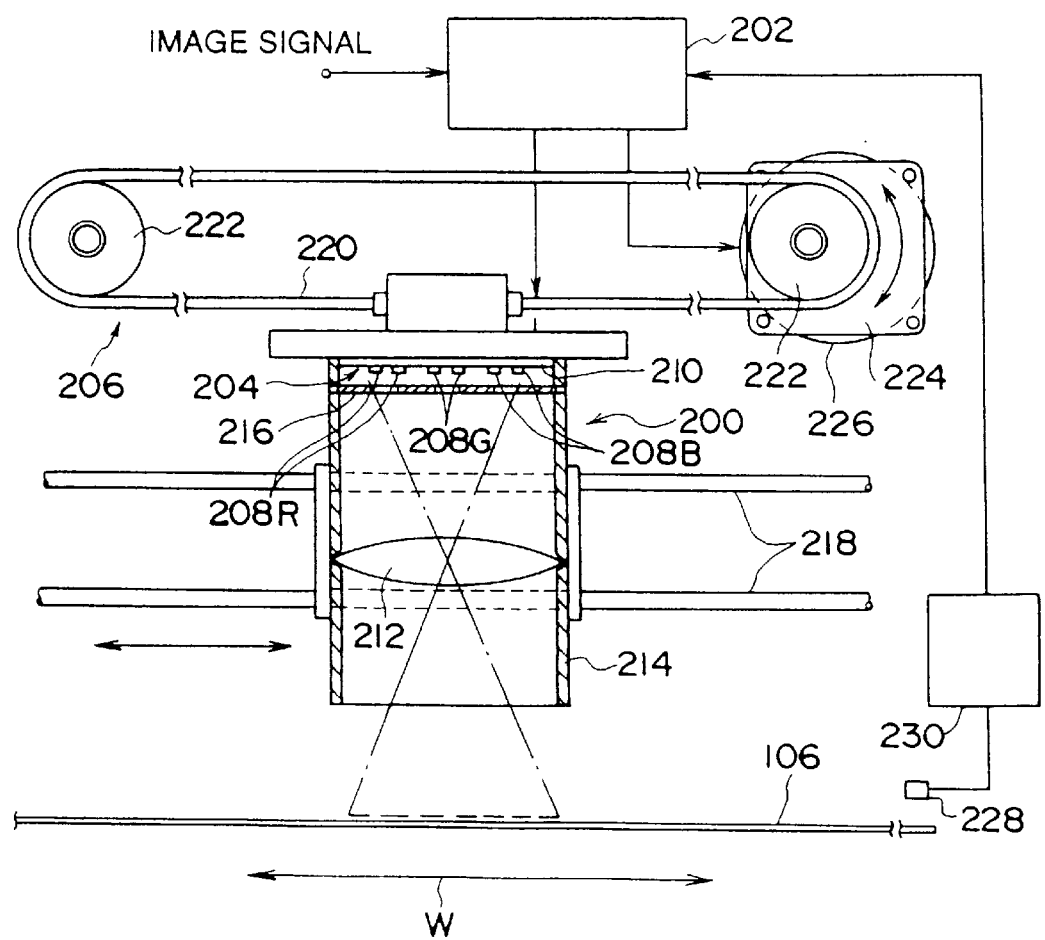
FIG. 4 is a front view showing a schematic structure of an exposure section.

Exposure Section:

FIG. 4 shows an exposure section 176 according to the present embodiment.

The exposure section 176 is mainly formed from a light source unit 200 provided above the conveying path of the photosensitive material 106 and is connected to a controller 202. An image signal (the image signal read from the optical disk 102 or FD 104) is stored in the controller 202 and a light source portion 204 within the light source unit 200 is turned on in accordance with the image signal. The light source unit 200 is provided to be movable in the transverse direction of the photosensitive material 106 (i.e., the main scanning direction) in such a manner as to be driven by a main scanning unit 206, which will be described later. The main scanning is effected when the photosensitive material 106 stops during step drive in the exposure section 176.

The light source unit 200 of the exposure section 176 is covered by a box-shaped exposure casing 214. The light source portion 204 is disposed on the upper end surface of the exposure casing 214 and a light emission surface of the light source portion 204 is directed toward an interior of the exposure casing 214. An aperture 216 is provided on the side of the light emission surface of the light source portion 204 to limit scattering of light from a plurality of LED chips 208. Meanwhile, the structure having no aperture 216 may also be used in the present invention.

A telecentric lens 212 is provided on the downstream side of the aperture 216 and at the central portion of the exposure casing 214 and serves to converge light from the light source portion 204 to form an image on the photosensitive material 106. Meanwhile, the resolution of light for image formation is about 250 to 400 dpi.

The telecentric lens 212 is formed by a plurality of lenses and a diaphragm and has characteristics in which magnification thereof does not vary even when the height of an image surface changes. The telecentric lens 212 can eliminate a difference in magnification, which occurs during the main scanning movement by the main scanning unit 206 or which is caused by a state in which the exposure casing 214 is mounted.

Further, the focus of the telecentric lens 212 is constantly adjusted by an automatic focusing mechanism (not shown). Alternatively, the telecentric lens 212 may also be formed as a lens system having a large depth of focus so as to eliminate the need of adjustment of the focus.

The light source portion 204 is supported by a pair of guide shafts 218 disposed parallel to each other and forming a part of the main scanning unit 206. These guide shafts 218 are provided along the transverse direction of the photosensitive material 106 (i.e., the direction indicated by arrow W in FIG. 4). The light source portion 204 is guided by the guide shafts 218 so as to be movable in the transverse direction of the photosensitive material 106.

A portion of an endless timing belt 220 is fixed at the exposure casing 214 of the light source portion 204. The timing belt 220 is entrained onto sprockets 222 positioned in the vicinities of both ends of the pair of guide shafts 218. The rotating shaft of one of the sprockets 222 is connected via a transmission 224 to the rotating shaft of a stepping motor 226. Due to reciprocating rotation of the stepping motor 226, the light source portion 206 is moved along the guide shafts 218 in a reciprocating manner.

The drive of the stepping motor 226 is controlled by the controller 202 and is synchronized with the step driving of the photosensitive material 106. Namely, in the state in which the photosensitive material 106 stops after one step movement, the stepping motor 226 starts rotating to move the light source portion 204 on the photosensitive material 106 along the transverse direction of the photosensitive material 106. When the stepping motor 226 is rotated in the reverse direction after having confirmed a predetermined number of pulses, the light source portion 204 returns to its original position. Subsequent movement of the photosensitive material 106 starts synchronously with the returning motion of the light source portion 204.

A photodiode 228 is provided at the side where light is emitted from the light source portion 204 to face the photosensitive material 106 and outputs a signal corresponding to a quantity of light from the light source portion 204. The photodiode 228 is connected to a light-quantity correction unit 230 and the above signal is inputted to the light-quantity correction unit 230.

The light-quantity correction unit 230 compares respective quantities of light from the LED chips 208 of each of the detected colors to adjust density and color balance, and also outputs a correction value to the controller 202. The image signal to be transmitted to the light source portion 204 is corrected based on the correction value and each LED chip 208 is turned on at a proper quantity of light.

Figure 5:
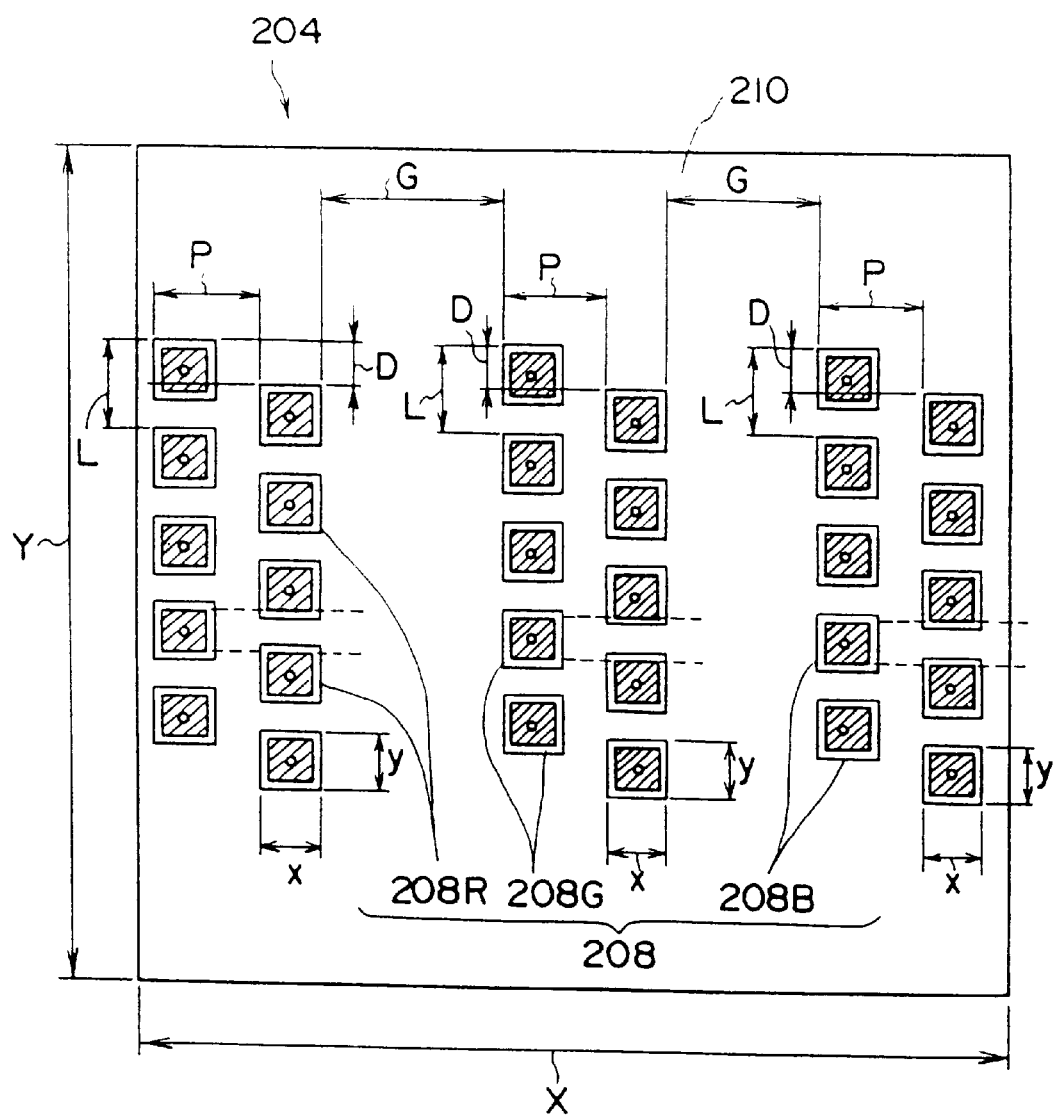
FIG. 5 is a plan view showing a light source portion of the exposure section.

As shown in FIG. 5, the light source portion 204 is formed with the plurality of LED chips 208 being arranged in groups. These LED chips 208 which emit light of colors of blue (B), green (G), and R (red) (when described below for each of the colors, the LED chip which emits light of blue is referred to as B-LED chip 208B, the LED chip which emits light of green is referred to as G-LED chip 208G, and the LED chip which emits light of red is referred to as R-LED chip 208R) are mounted onto a substrate 210 along the transverse direction of the photosensitive material 106 (i.e., the main scanning direction) in accordance with the same arrangement rule. Meanwhile, the wavelength of light from the R-LED chip 208R is 650±20 nm, the wavelength of light from the G-LED chip 208G is 530±30 nm, and the wavelength of light from the B-LED chip 208G is 470±20 nm.

On the substrate 210 in the plan view shown in FIG. 5, ten B-LED chips 208B are arranged in two rows and in a zigzag manner at the right end, ten R-LED chips 208R are arranged in two rows and in a zigzag manner at the left end, and ten G-LED chips 208G are arranged in two rows and in a zigzag manner at the central position. Namely, the totaled six rows of LED chips 208 are arranged.

A predetermined wiring arrangement is provided on the substrate 210 by etching processing or the like and the substrate 210 is covered by metal for heat dissipation so as not to cause a short circuit between these wires. For this reason, generation of heat due to the LED chips 208 being turned on can be restricted and variation of an amount by which light is emitted can also be limited.

The dimensions of each of parts of the light source portion 204 applied to the present embodiment are as follows.

The horizontal and vertical dimensions (X, Y) of the substrate 210 are 5×5 mm (maximum) and the dimensions of each LED chip 208 (x×y) are about 360×360 $\mu$m. The row pitch P of the same color LED chips is 600 $\mu$m, the line pitch L of each row of the LED chips is 520 $\mu$m, and the distance D of a stepped portion formed in the zigzag arrangement along the vertical direction of the substrate is 260 $\mu$m. The distance G of a space between the adjacent groups of LED chips cannot be determined univocally, but is determined by the telecentric lens 212. Preferably, the respective distances G between the R-LED chips 208R and the G-LED chips 208G and between the G-LED chips 208G and the B-LED chips 208B are equal to each other.

The diagonal line section of each of the LED chips 208 shown in FIG. 5 is a region from which light is actually emitted. As shown in the diagonal lines shown in FIG. 5, borders of the light emission region in the adjacent rows of LED chips are provided to coincide with each other.

The light source portion 204 having above-described structure allows recording of ten main scanning lines by one main scanning operation for each of the colors. For this reason, step movement of the photosensitive material 106 is controlled such that the photosensitive material 106 is driven and stopped repeatedly at a pitch of ten times the width of a main scanning line recorded thereon.

Reservoir Portion:

The reservoir portion 170 is, as described above, disposed between the exposure section 176 and the water applying portion 178 and is formed by two pairs of nip rollers 192, 194 and one dancer roller 196. The photosensitive material 106 is entrained between the two pairs of nip rollers 192, 194 and a substantially U-shaped slack portion is formed in the photosensitive material 106 between the pairs of nip rollers. The dancer roller 196 is provided to move up and down correspondingly to the slack portion so as to hold the slack portion of the photosensitive material 106.

In the exposure section 176, the photosensitive material 106 moves in a stepwise manner, but in the water applying portion 178, it is necessary that the photosensitive material 106 be conveyed at a fixed speed so as to allow uniform application of water onto the photosensitive material 106. For this reason, the difference in the conveying speed of the photosensitive material 106 is generated between the exposure section 176 and the water applying portion 178. In order to eliminate the difference in the conveying speed, the dancer roller 196 is moved up and down to adjust an amount of slack formed in the photosensitive material 106 so that the stepwise movement and the constant-speed movement of the photosensitive material 106 can thereby be effected synchronously.

Next, an operation of the present embodiment will be described.

An overall flow of an image recording operation will be first described.

In the state of loading being completed in which the tray 144 is mounted at the tray mounting hole 146 and the feed reel 152 onto which the photosensitive material 106 is completely taken up and the take-up reel 154 which is in an empty state are mounted at respective predetermined positions, when a printing start key of the operation indication portion 112 is operated, the controller 202 reads and stores image data from the optical disk 102 or the FD 104.

When the image data is stored by the controller 202, the feed reel 152 is driven to start conveying the photosensitive material 106.

When the photosensitive material 106 reaches a predetermined position in the exposure section 176, the photosensitive material 106 is stopped temporarily and an image signal is outputted from the controller 202 to the light source portion 204. The image signal is outputted every ten lines and the light source portion 204 is guided by the guide shaft 218 by driving of the stepping motor 226 to move along the transverse direction of the photosensitive material 106 (main scanning). Prior to the outputting of the image signal, the quantity of light for each of the colors from the light source portion 204 is detected by the photodiode 228, and in the light-quantity correction unit 230, a correction value for adjustment of density, color balance, and the like is supplied to the controller 202, to thereby correct the image signal. The correction value is provided for each image.

When first main scanning is completed, the photosensitive material 106 is moved for one step (10-line pitch) and stops, and subsequently, second main scanning is effected. By repeating the above main scanning, an image of one frame is recorded on the photosensitive material 106. The photosensitive material 106 on which the image has been recorded is held by drive of only upstream side nip roller pair 192 in the reservoir portion 170 (a downstream side nip roller pair 194 is stopped) in the state of having a slack portion in the reservoir portion 170 to be entrained onto the dancer roller 196. For this reason, the above photosensitive material 106 is not provided to reach the water applying portion 178.

When the photosensitive material 106 having a length of one image is accumulated in the reservoir portion 170, the nip roller pair 194 at the downstream side of the reservoir portion 170 starts driving. As a result, the photosensitive material 106 (recording of images thereon has been completed) is conveyed to the water applying portion 178. In the water applying portion 178, the photosensitive material 106 is conveyed at a constant speed and water is uniformly applied to the photosensitive material by the applying member 188.

Water is constantly conveyed from the tank 190 to the applying member 188 and the photosensitive material 106 is pressed by the applying member 188 at a predetermined pressure. For this reason, a proper amount of water is applied to the photosensitive material 106.

The photosensitive material 106 to which water is applied is guided by the guide plate 172 and conveyed to the third roller pair 166.

On the other hand, the peripheral surface of the semicircular roller 156 and the leading end of the image receiving paper 108 contact each other due to one rotation of the semicircular roller 156, and the image receiving paper 108 of the uppermost layer is pulled out and is nipped by the first roller pair 160. The image receiving paper 108 waits for arrival of the photosensitive material 106 in the state of being pulled out from the tray 144 by being driven by the first roller pair 160 and nipped by the second roller pair 162.

Synchronously with the passing of the photosensitive material 106 through the guide plate, the first roller pair 160 and the second roller pair 162 start driving so that the image receiving paper 108 is guided by the guide plate 164 and conveyed to the third roller pair 166.

The photosensitive material 106 and the image receiving paper 108 are nipped by the third roller pair 166 in an overlapping state and are conveyed to the heat roller 174. At this time, the photosensitive material 106 and the image receiving paper 108 closely adhere to each other by water applied to the photosensitive material 106.

The photosensitive material 106 and the image receiving paper 108 in the overlapping manner are entrained onto the heat roller 174 and is subjected to heat from the heater 182 for heat development-transfer processing. In other words, the image recorded on the photosensitive material 106 is transferred onto the image receiving paper 108 so as to form an image on the image receiving paper 108.

The heat development-transfer processing is completed in the state in which the image receiving paper 108 is wound onto the heat roller 174 by a length of about one third the entire circumference of the roller, and subsequently, the image receiving paper 108 is separated from the photosensitive material 106 by the peeling roller 184 and the peeling claw 186, and is discharged onto the discharge tray 140 in the state in which it is wound onto the peeling roller 184.

On the other hand, the photosensitive material 106 is wound onto the heat roller 174 by a length of about a half the overall circumference of the roller, and thereafter, the photosensitive material 106 moves in the tangential direction to be wound onto the take-up reel 154.

In the above-described embodiment, image recording can be effected with a compact-type structure, and since the optical-disk deck 124 and the FD deck 126 are loaded in the apparatus, the image data can be urgently taken in. Further, an image to be recorded can be confirmed by the monitor portion 114, and therefore, adjustment of density and color balance becomes facilitated.

Moreover, the discharge tray 140 of a storage type is provided, and therefore, the apparatus has an external appearance with a small number of uneven portions in a non-operating state in which the tray 144 where the image receiving paper 108 is accommodated is removed from the apparatus, thereby resulting in effective utilization of an operating space.

In addition, in the apparatus of the present embodiment, the water applying portion 178 and the exposure section 176 are provided fixedly with respect to the conveying direction of the photosensitive material 106 and the relative movement of the water applying portion 178 and the exposure section 176 with respect to the photosensitive material 106 is effected by movement of the photosensitive material 106 in all cases, thereby resulting in simplification of a moving mechanism.

The present embodiment is provided such that the optical-disk deck portion 124 and the FD deck portion 126 are loaded in the apparatus, but a deck portion in which other recording medium (for example, a photomagnetic disk (MO), a phase-change disk (PD), a video tape, and the like) can be loaded may also be provided. Further, an image input terminal which is used to take in an image signal from an exterior (for example, a personal computer, a television, and the like) can also be provided.

Second Embodiment

A second embodiment of the present invention will be described hereinafter. It should be noted that the same structural portions as those of the first embodiment will be denoted by the same reference numerals, and a description thereof will be denoted.

Figure 6:
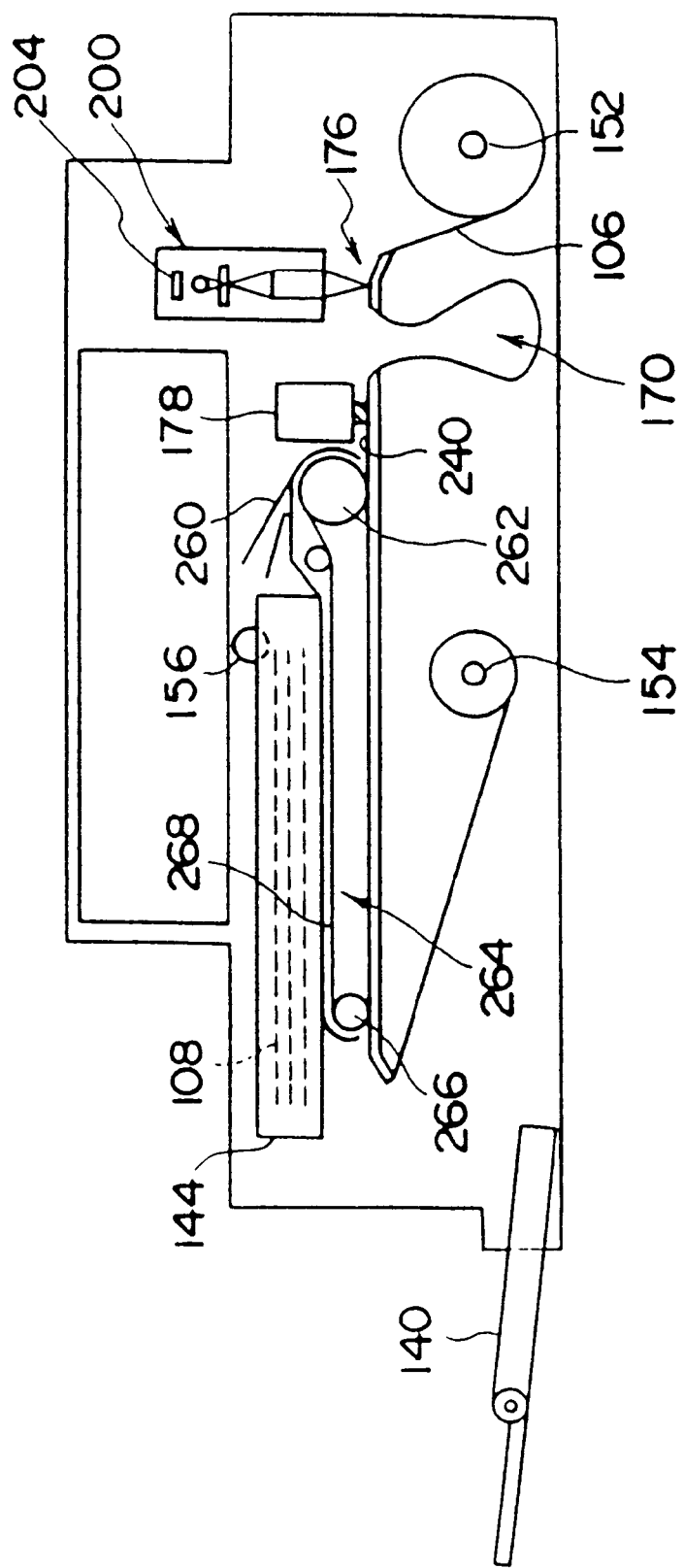
FIG. 6 is a cross-sectional side view showing an internal structure of an image recording apparatus according to a second embodiment of the present invention.

As shown in FIG. 6, the photosensitive material 106 pulled out from the feed reel 152 positioned at the right side of the apparatus (on the paper of FIG. 6) is conveyed onto the guide plate 240 and is moved in a planar manner along the surface of the guide plate 240 and is then wound onto the take-up reel 154.

The light source unit 200 is provided at the utmost upstream side of the guide plate 240 and is formed as the exposure section 176.

The water applying portion 178 is provided at the downstream side of the light source unit 200 and water is applied onto the photosensitive material 106 on which the image is recorded. The tray 144 in which sheet-shaped image receiving papers 108 are accommodated in a layered form is provided at the downstream side of the water applying portion 178 and above the guide plate 240.

A guide member 260 is provided in the tray 144 at the side where the image receiving paper 108 is pulled out (i.e., at the right side of the apparatus on the paper of FIG. 6), and the image receiving paper 108 pulled out by the semicircular roller 156 is guided by the guide plate 260 to the peripheral surface of the overlapping roller 262.

The overlapping roller 262 contacts the guide plate 240 at a predetermined pressure and serves to allow the image receiving paper 108 and the photosensitive material 106 to overlap with each other.

A heat development section 264 is provided between the tray 144 and the guide plate 240. The heat development section 264 is formed by an endless heating belt 268 entrained between the overlapping roller 262 and an idle roller 266 provided at the left side end of the guide plate 240 on the paper of FIG. 6, and is also formed by a heater (not shown) for heating the heating belt 268. The heating belt 268 conveys the image receiving paper 108 and the photosensitive material 106 passing onto the guide plate 240 while nipping and pressurizing together with the guide plate 240. Due to the image receiving paper 108 and the photosensitive material 106 being subjected to heating processing, the heat development-transfer processing is effected.

At the left end of the guide plate 240 on the paper of FIG. 6, the photosensitive material 106 is abruptly turned reverse to reach the take-up reel 154. For this reason, the image receiving paper 108 cannot follow the photosensitive material 106 abruptly turned reverse, and as a result, the image receiving paper 108 is separated from the photosensitive material 106 at the left end of the guide plate 240.

The separated image receiving paper 108 is conveyed onto the discharge tray 140 and is discharged from the apparatus.

Further, the reservoir portion 170 is provided between the light source unit 200 and the water applying portion 178 so as to eliminate the difference in the conveying speed of the photosensitive material between the step-wise movement in the exposure section 176 and the constant-speed movement in the water applying portion 178.

In the image recording apparatus according to the second embodiment having the above-described structure, when the photosensitive material 106 is exposed in the exposure section 176, the photosensitive material 106 moves in a stepwise manner. The photosensitive material 106 thus moved is accommodated in the reservoir portion 170. At the time of completion of the image recording processing, the photosensitive material 106 in the reservoir portion 170 is conveyed to the guide plate 240. The photosensitive material 106 is subjected to water applying processing in the water applying portion 178 during the above conveying, and is overlapped with the image receiving paper 108 which has been pulled out from the tray 144 by driving of the overlapping roller 262 and the heating belt 268 and conveyed by the guide plate 260. Subsequently, the photosensitive material 106 stops on the guide plate 240.

The heat development-transfer processing is effected on the guide plate 240 when the photosensitive material 106 is in a stopping state, and after completion of the heat development-transfer processing, the photosensitive material 106 is taken up onto the take-up reel 154, and the image receiving paper 108 is separated from the photosensitive material 106 and is discharged onto the tray 140.

As described above, heat development processing is effected in such a manner that the photosensitive material 106 and the image receiving paper 108 are conveyed in a planar manner, and therefore, the apparatus is made compact.

Moreover, the photosensitive material 106 is separated from the image receiving paper 108 in such a manner that the photosensitive material is abruptly turned reverse at the left side of the guide plate 240 on the paper of FIG. 6, and therefore, no member for the above separation becomes necessary.

Third Embodiment

Next, a third embodiment of the present invention will be described. Note that a conveying system of the photosensitive material 106 in the third embodiment is the same as that of the second embodiment.

Further, the heat development section 264 and the tray 144 in the third embodiment have the same structures of those of the second embodiment. However, in the third embodiment, the heat development section 264 and the tray 144 are provided to reciprocate between a position above the guide plate 240 (indicated by the broken line in FIG. 7) and a position projected from the left side surface of the apparatus (indicated by the solid line in FIG. 7), which will be hereinafter referred to as a moving unit 270.

Figure 7:
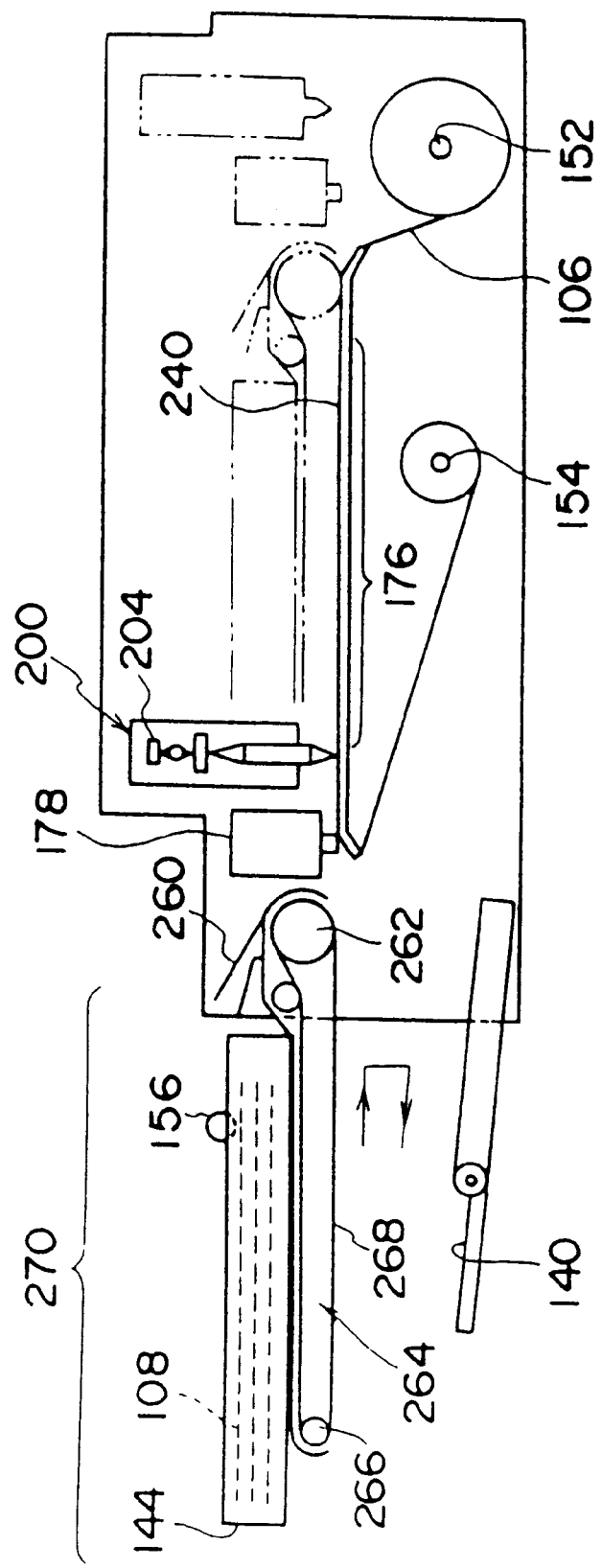
FIG. 7 is a cross-sectional side view showing an internal structure of an image recording apparatus according to a third embodiment of the present invention.

Further, the water applying portion 178 is mounted at the right side end of the moving unit 270 on the paper of FIG. 7 and is provided to move integrally with the tray 144 and the heat development section 264. The light source unit 200 described in the first embodiment is disposed at the right side end of the moving unit 270, namely, adjacent to the water applying portion 178 and is provided to independently reciprocate on the guide plate 240 in the left-and-right directions on the paper of FIG. 7.

The moving timing of the moving unit 270 and the light source unit 200 is controlled in such a manner that, at the time when only the light source unit 200 first moves from the position indicated by the solid line in FIG. 7 toward the right side on the paper of FIG. 7 to reach the position indicated by the broken line in FIG. 7, the moving unit 270 moves toward the right side on the paper of FIG. 7 to reach the position indicated by the broken line in FIG. 7, and thereafter, the moving unit 270 returns to the position indicated by the solid line in FIG. 7 together with the light source unit 200.

Conveying of the photosensitive material 106 is stopped in the state in which a region to be subsequently exposed is positioned on the guide plate 240. During the conveying of the photosensitive material 106, the moving unit 270 waits in the state in which the light source unit 200 is positioned at the left end of the guide plate 240 on the paper of FIG. 7.

Here, the light source portion 200 moves on the guide plate 240 in a stepwise manner and every ten-line main scanning width. As a result, the image is recorded on the photosensitive material 106.

Subsequently, the moving unit 270 is conveyed at a constant speed, and at this time, water is applied onto the photosensitive material 106 by the water applying portion 178, and at the same time, the image receiving paper 108 is pulled out from the tray 144 and is conveyed between the heating belt 268 and the photosensitive material 106 located on the guide plate 240 to overlap with the photosensitive material 106.

When the moving unit 270 reaches the position indicated by the broken line in FIG. 7, the heating belt 268 is actuated and the photosensitive material 106 is taken up onto the take-up reel 154. As a result, the image receiving paper 108 is separated from the photosensitive material 106 at the left end of the guide plate 240 on the paper of FIG. 7 and is discharged into the discharge tray 140.

According to the above described third embodiment, the light source unit 200 and the moving unit 270 are independently moved, the step-wise movement required during exposure in the light source unit 200 (in this case, the exposure section 176 means a substantially entire region of the guide plate 240) and the constant-speed conveying motion required for water applying processing can be realized without providing a reservoir portion of the photosensitive material 106.

Meanwhile, each of the above-described embodiments is provided such that the LED chips 108 are arranged, as the light source portion 204, in a zigzag manner. However, as shown in FIG. 8, these LED chips may be arranged in vertical and horizontal directions in such a manner that LED chips of each color are arranged in one row. Further, the number of LED chips and the number of rows of the chips may be varied for each of the colors.

As described above, the image recording apparatus having the image exposure device according to the present invention has an excellent effect of being made compact with a simple structure without requiring relatively high assembling accuracy.

What is claimed is:

1. An image exposure device in which an image is recorded on a photosensitive material by controlling emission of light of three colors from a light source with an image data signal, comprising:

the light source in which LED chips of three colors each having a different light-emission peak wavelength are mounted onto a common substrate so that at least one LED chip provided for each of the three colors is arranged in a straight line;

an optical system for forming an image on the photosensitive material with light from the LED chips of the three colors;

a main scanning drive system which moves a unit, in which said light source and said optical system are formed integrally with each other, so that the same straight line is scanned with light from the LED chips of the three colors; and a sub-scan drive system which moves the photosensitive material in a stepwise manner in a direction perpendicular to a main scanning direction per each main scanning operation;

where said light source is formed in such a manner that the LED chips of the three colors, apart from those arranged in one row, are provided also in a direction perpendicular to said one row of the LED chips in a plurality of rows at equal intervals.

2. An image exposure device according to claim 1, wherein the LED chips of the three colors which are provided in a plurality of rows at equal intervals in the direction perpendicular to said one row of the LED chips of the three colors are arranged in a zigzag manner.

3. An image exposure device according to claim 2, wherein the LED chips disposed adjacently in the direction perpendicular to those arranged in the one row are each provided with a zigzag-like stepped portion so that borders of regions from which light is actually emitted coincides with each other.

4. An image exposure device according to claim 1, wherein the substrate is made of a metal plate which is insulated for each of LED wires to prevent short-circuit.

5. An image exposure device according to claim 1, wherein said optical system is formed by a telecentric lens.

6. An image recording apparatus in which image data recorded on a recording medium is exposed onto a photosensitive material and the exposed image data on the photosensitive material is transferred to an image receiving paper conveyed from other route, comprising:

a feed reel which supplies the photosensitive material;

an exposure section which exposes the photosensitive material conveyed from said feed reel;

a light source portion in which LED chips of three colors each having a different light emission peak wavelength are provided on an upper-side substrate of said exposure section so that first, second, and third color units of LED chips, each having at least one LED chip, are arranged in a main scanning direction in a straight line;

a controller which takes in the image data and outputs as an image signal to said light source portion;

an optical system for forming an image on the photosensitive material with light from the groups of the LED chips of the three colors;

a main scanning drive system which moves an exposure unit, in which said light source portion and said optical system are formed integrally with each other, so that the same straight line is scanned with the light from the groups of the LED chips of the three colors;

a sub-scan drive system which moves the photosensitive material in a stepwise manner in a direction perpendicular to a main scanning direction for each time of the main scanning;

a reservoir in which the photosensitive material moved by said sub-scan drive system in a stepwise manner is temporarily held;

a water applying portion which applies water onto the photosensitive material whose moving speed is made uniform by said reservoir;

an overlapping portion which causes the photosensitive material conveyed from said water applying portion and the image receiving paper conveyed from the other route to tightly adhere to each other; and a heating portion which heats the photosensitive material and the image receiving paper conveyed from said overlapping portion to transfer the image data of the photosensitive material onto the image receiving paper.

7. An image recording apparatus in which image data recorded on a recording medium is exposed onto a photosensitive material and the exposed image data on the photosensitive material is transferred to an image receiving paper conveyed from another route, comprising:

a feed reel which supplies the photosensitive material;

an exposure section which exposes the photosensitive material conveyed from said feed reel;

a light source in which LED chips of three colors each having a different light-emission peak wavelength are provided on an upper-side substrate of said exposure section so that first, second, and third color units of LED chips, each having at least one LED chip, are arranged in a main scanning direction in a straight line;

a controller which takes in the image data and outputs as an image signal to said light source portion;

an optical system for forming an image on the photosensitive material with light from the groups of the LED chips of the three colors;

a main scanning drive system which moves an exposure unit, in which said light source portion and said optical system are formed integrally with each other, so that the same straight line is scanned with light from the groups of the LED chips of the three colors;

a sub-scan drive system which moves the photosensitive material in a stepwise manner in a direction perpendicular to a main scanning direction for each time of the main scanning;

a reservoir in which the photosensitive material moved by said sub-scan drive system in a stepwise manner is temporarily held;

a water applying portion which applies water onto the photosensitive material whose moving speed is made uniform by said reservoir;

an overlapping portion which causes the photosensitive material conveyed from said water applying portion and the image receiving paper conveyed from the other route to tightly adhere to each other; and a heating portion which heats the photosensitive material and the image receiving paper conveyed from said overlapping portion to transfer the image data of the photosensitive material onto the image receiving paper;

a photodiode which is provided at an output side of said exposure unit to face the photosensitive material and outputs a signal in accordance with an amount of light from each of the LED chips of said light source portion; and a light-quantity correction unit which is connected to said photodiode and compares the signals outputted from each of said LED chips to adjust density and color balance and transmits the signal as a correction value to said controller.

8. An image recording apparatus according to claim 6, wherein said overlapping portion which allows the photosensitive material to which water is applied by said water applying portion and the image receiving paper to tightly adhere to each other on a guide plate, and said heating portion for heating the photosensitive material and the image receiving paper in an overlapping state are disposed above said guide plate.

9. An image recording apparatus according to claim 8, wherein said overlapping portion, said heating portion, and said water applying portion are formed as a moving unit in such a manner as to reciprocate integrally between a position on the guide plate and a position projected from the guide plate toward a conveying direction of the photosensitive material.

10. An image recording apparatus, in which image data recorded on a recording medium is exposed onto a photosensitive material and the exposed image data on the photosensitive material is transferred to an image receiving paper conveyed from another route, comprising:

a feed reel which supplies the photosensitive material;

an exposure section which exposes the photosensitive material conveyed from said feed reel;

a light source in which LED chips of three colors each having a different light-emission peak wavelength are provided on an upper-side substrate of said exposure section so that first, second, and third color units of LED chips, each having at least one LED chip, are arranged in a main scanning direction in a straight line;

a controller which takes in the image data and outputs as an image signal to said light source portion;

an optical system for forming an image on the photosensitive material with light from the groups of the LED chips of the three colors;

a main scanning drive system which moves an exposure unit, in which said light source portion and said optical system are formed integrally with each other, so that the same straight line is scanned with light from the groups of the LED chips of the three colors;

a sub-scan drive system which moves the photosensitive material in a stepwise manner in a direction perpendicular to a main scanning direction for each time of the main scanning;

a reservoir in which the photosensitive material moved by said sub-scan drive system in a stepwise manner is temporarily held;

a water applying portion which applies water onto the photosensitive material whose moving speed is made uniform by said reservoir;

an overlapping portion which causes the photosensitive material conveyed from said water applying portion and the image receiving paper conveyed from the other route to tightly adhere to each other; and a heating portion which heats the photosensitive material and the image receiving paper conveyed from said overlapping portion to transfer the image data of the photosensitive material onto the image receiving paper;

wherein said overlapping portion which allows the photosensitive material to which water is applied by said water applying portion and the image receiving paper to tightly adhere to each other on a guide plate, and said heating portion for heating the photosensitive material and the image receiving paper in an overlapping state are disposed above said guide plate;

wherein said overlapping portion, said heating portion, and said water applying portion are formed as a moving unit in such a manner as to reciprocate integrally between a position on the guide plate and a position projected from the guide plate toward a conveying direction of the photosensitive material;

wherein said exposure unit is provided to reciprocate between a position on the guide plate and a position projected from the guide plate to the conveying direction of the photosensitive material and moving timing of said exposure unit is different from that of said moving unit.

11. An image recording apparatus according to claim 6, wherein said light source is formed in such a manner that the LED chips of the three colors, apart from those arranged in a straight line and in one row, are provided also in a direction perpendicular to said one row of the LED chips in a plurality of rows at equal intervals.

12. An image recording apparatus according to claim 11, wherein the LED chips of the three colors which are provided in a plurality of rows at equal intervals in the direction perpendicular to said one row of the LED chips of the three colors are arranged in a zigzag manner.

13. An image recording apparatus according to claim 12, wherein LED chips disposed adjacently in the direction perpendicular to those arranged in the one row of the LED chips are each provided with a zigzag-like stepped portion so that borders of regions from which light is actually emitted coincides with each other.

14. An image recording apparatus according to claim 6, wherein a distance between the first color unit of LED chips and the second color unit of LED chips is set to be equal to that between the second color unit of LED chips and the third color unit of LED chips.

15. An image recording apparatus according to claim 6, wherein said light source portion has, at a lower side thereof, an aperture which limits scattering of light from the plurality of LED chips.

16. An image recording apparatus according to claim 6, wherein said exposure unit is supported by an endless belt entrained above the main scanning direction, and a pair of guide rails provided below the endless belt along a vertical direction.

17. An image recording apparatus according to claim 6, wherein the substrate is made of a metal plate which is insulated for each of LED wires to prevent short-circuit.

18. An image recording apparatus according to claim 6, wherein said optical system is formed by a telecentric lens.

* * * * *